(12) United States Patent
Vancoill et al.

(10) Patent No.: US 6,959,133 B2
(45) Date of Patent: Oct. 25, 2005

(54) OPTICAL COUPLING MODULE AND METHOD FOR FORMING THE SAME

(75) Inventors: Eric Vancoill, Singapore (SG); Adrianus J. P. van Haasteren, Singapore (SG)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/752,130

(22) Filed: Jan. 6, 2004

(65) Prior Publication Data

US 2005/0147353 A1    Jul. 7, 2005

(51) Int. Cl.[7] ............................. G02B 6/26; G02B 6/42
(52) U.S. Cl. ........................ 385/47; 385/77; 385/140
(58) Field of Search ........................... 385/27, 31, 39, 385/47, 76, 77, 140

(56) References Cited

U.S. PATENT DOCUMENTS

| | | | | |
|---|---|---|---|---|
| 5,028,110 A | * | 7/1991 | Plummer | 385/42 |
| 5,539,577 A | * | 7/1996 | Si et al. | 359/629 |
| 5,748,816 A | * | 5/1998 | Jaksic et al. | 385/39 |
| 6,021,008 A | * | 2/2000 | Leib | 359/886 |
| 6,542,671 B1 | * | 4/2003 | Ma et al. | 385/47 |
| 6,888,988 B2 | * | 5/2005 | Vancoille et al. | 385/47 |
| 2002/0118917 A1 | * | 8/2002 | Kawai | 385/31 |
| 2004/0208538 A1 | * | 10/2004 | Liwak | 398/45 |

* cited by examiner

Primary Examiner—Frank G. Font
Assistant Examiner—Derek L. Dupuis

(57) ABSTRACT

A monolithic optical coupling module for coupling a light beam is disclosed. The optical coupling module has a light beam input portion, a light beam output portion and at least one integrally formed light beam attenuator between the light beam input portion and the light beam output portion. The monolithic optical coupling module may be unitarily fabricated of a moldable polymeric material. The light beam attenuator may be a roughened surface or a roughened internal portion. A method for forming the monolithic optical coupling module is also disclosed.

20 Claims, 8 Drawing Sheets

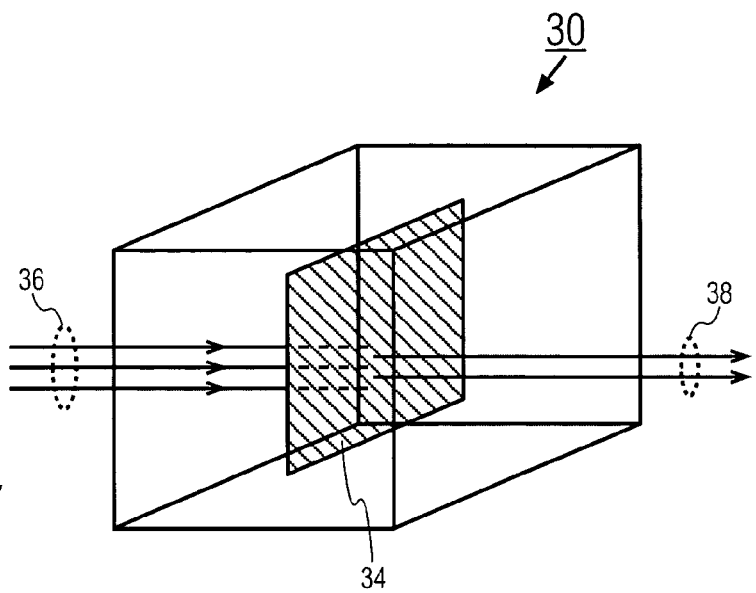
*FIG. 5*
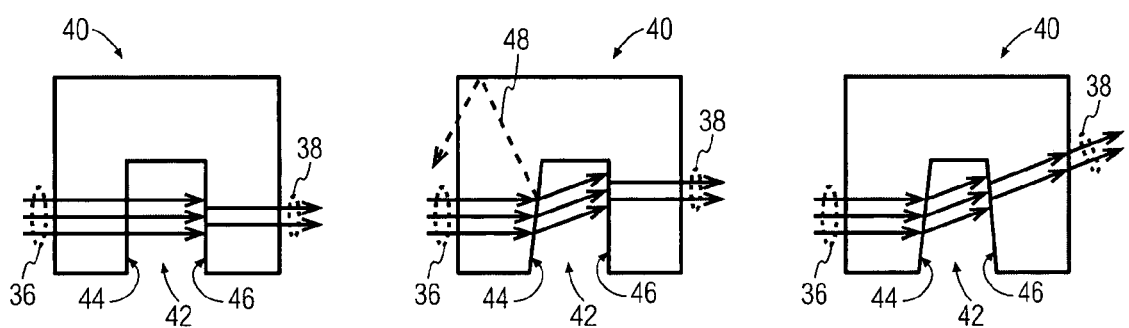
*FIG. 6A*   *FIG. 6B*   *FIG. 6C*
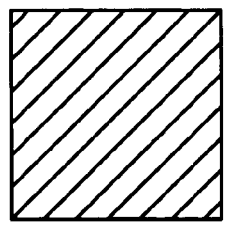   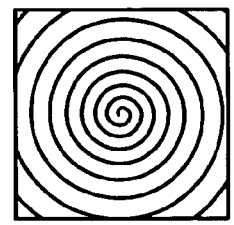
*FIG. 7A*   *FIG. 7B*
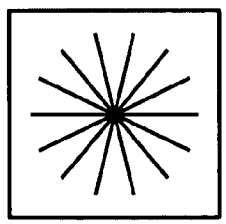
*FIG. 7C*

OPTICAL COUPLING MODULE AND METHOD FOR FORMING THE SAME

BACKGROUND

This invention relates to an optical coupling module with an integral attenuator for coupling a light beam between a source and a receiver. This invention also relates a method for forming the optical coupling module.

Known optical coupling modules for use in optical transmitters, receivers and transceivers typically include a number of elements that need to be aligned and assembled using specially built production equipment. Alignment and assembly of such optical coupling modules is costly. FIG. 1 shows a prior art optical transmitter having such a design. Consequently, an objective in the design of optical coupling modules is therefore to limit the number of components and associated alignment steps. The optical transmitter includes a header received in an optical coupling module. The header supports a laser therein. The header has a window through which laser light is emitted. The optical coupling module includes a lens and a fiber receptacle. The laser, lens and fiber receptacle need to be accurately aligned. U.S. Pat. No. 5,937,114 discloses another optical coupling module that includes optical and mechanical piece parts or elements that have to be accurately fabricated and assembled to prevent tolerance build-up.

The assembly process for these known optical coupling modules might be further complicated by the need to include an attenuator for attenuating a light beam that propagates through each of the optical coupling modules. For example, when an optical coupling module is a part of an optical receiver, there might be a need to attenuate a light beam received from an optical fiber so as to match the power range of the light beam with the dynamic range of an optical detector. Similarly, the introduction of an attenuator in an optical transmitter typically limits the optical power launched into an optical fiber to be within specifications according to a respective fiber communication standard. The attenuator is employed in the optical transmitter to allow a laser in the optical transmitter to be driven with a current that allows optimal dynamic performance of the laser, while limiting the optical power launched into an optical fiber. One typical parameter that is often optimized by increasing the average laser drive current is the laser relaxation oscillation frequency.

In accordance with a known method, the intensity of a light beam that is launched into a fiber may be reduced by shifting an element of the optical coupling module away from its optically aligned position, where the optically aligned position results in maximum coupling efficiency by the elements of the optical coupling module. For instance, the launched power can be tuned by shifting the fiber either closer or further away from the laser. This intentional shift, away from an optimum position, has the disadvantage that it causes the optical coupling module to operate under sub optimal coupling efficiency conditions, as indicated by region X, as shown in FIG. 2. When operating in region X, the optical coupling module is more sensitive to external disturbances, such as temperature changes, as compared to a module that is aligned for maximum coupling efficiency, as indicated by point Y in FIG. 2. Consequently, a small amount of thermal expansion of the elements of the optical coupling module is likely to cause a relatively large change in the optical power emitted by the laser that is launched into an optical fiber, which might exceed specifications set by the communication standard.

Another known method of attenuating a light beam is by deposition of a reflective coating on one or more surfaces of one or more optical elements of an optical coupling module. For example, the window and the lens of the optical transmitter in FIG. 1 may have a reflective coating thereon. Reflective coatings on glass surfaces are common for providing attenuation, however such coatings can be costly. Furthermore, a reflective coating has the disadvantage in that its optical transmittance might depend on the state of polarization of the light beam, which will limit its usability. In addition to being costly and polarization sensitive, another disadvantage of applying a reflective coating on a polymer surface is that at elevated temperatures, cracks might appear in the coating layers due to the difference in thermal expansion of the coating layer and the polymer. These cracks will disturb a light beam impinging on the reflective coating and thereby affect transmission of the light beam therethrough.

SUMMARY

According to an embodiment of the invention, there is provided a monolithic optical coupling module. The optical coupling module has a light beam input portion, a light beam output portion and at least one integrally formed light beam attenuator located in an optical path between the light beam input portion and the light beam output portion.

According to another embodiment of the invention, there is provided a monolithic optical coupling module including a first surface portion and a second surface portion opposite the first surface portion. The first surface portion and the second surface portion define a gap in the monolithic optical coupling module. At least one of the first surface portion and the second surface portion comprises an integrally-formed light beam attenuator that attenuates a light beam propagating therethrough to provide an attenuated light beam.

According to yet another embodiment of the invention, there is provided a method for forming a monolithic optical coupling module having a light beam input portion and a light beam output portion. The method includes integrally forming a light beam attenuator in a light path between the light beam input portion and the light beam output portion.

BRIEF DESCRIPTION OF DRAWINGS

The invention will be better understood with reference to the drawings, in which:

FIG. 5 is an isometric drawing of a monolithic optical coupling module according to an embodiment of the invention, the optical coupling module having an integrally formed attenuator in the form of an internal portion that scatters a light beam; the amount of attenuation depending on the characteristics of the light scattering portion;

FIGS. 6A, 6B and 6C are side views of optical coupling modules having a gap defined therein according to embodiments of the invention, the optical coupling modules each having at least one surface defining the gap roughened to function as an integral attenuator;

FIGS. 7A, 7B, and 7C are drawings of a hatching pattern, a spiral pattern and a radial pattern respectively which may be produced when forming the roughened areas in FIGS. 5, 6A, 6B and 6C;

DETAILED DESCRIPTION

A monolithic optical coupling module, according to an embodiment of the invention, includes a light beam input portion, a light beam output portion and at least one integrally formed light beam attenuator located in an optical path between the light beam input portion and the light beam output portion. During use, the monolithic optical coupling module is placed in the path of an input light beam emitted from a light source such that the light beam propagates in the module to impinge on the light beam attenuator to be thereby attenuated. In some embodiments, the input light beam portion includes optical elements for pre-attenuation processing of the input light beam and the output light beam portion includes optical elements for post-attenuation processing of the attenuated light beam.

The monolithic optical coupling module is unitarily fabricated of a moldable polymeric material or other light transmissive material. Examples of such materials include, but are not limited to, polyetherimide, polyimide, polysulfone, polycarbonate and other materials disclosed, for example, in U.S. Pat. No. 5,708,743. The optical coupling modules of these materials may be manufactured using a polymer injection molding process similar to that commonly employed for contact lenses, intra-ocular lenses, or other ophthalmic elements.

Figure 1:
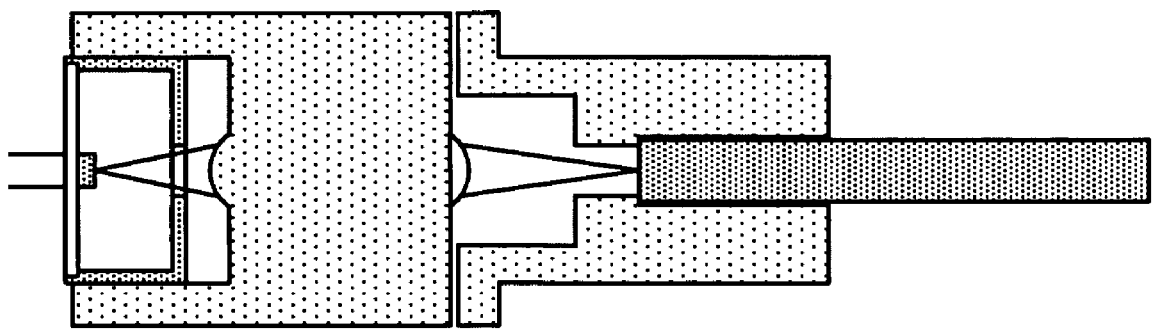
FIG. 1 is a sectional drawing of an optical transmitter that includes a prior art optical coupling module.
Figure 2:
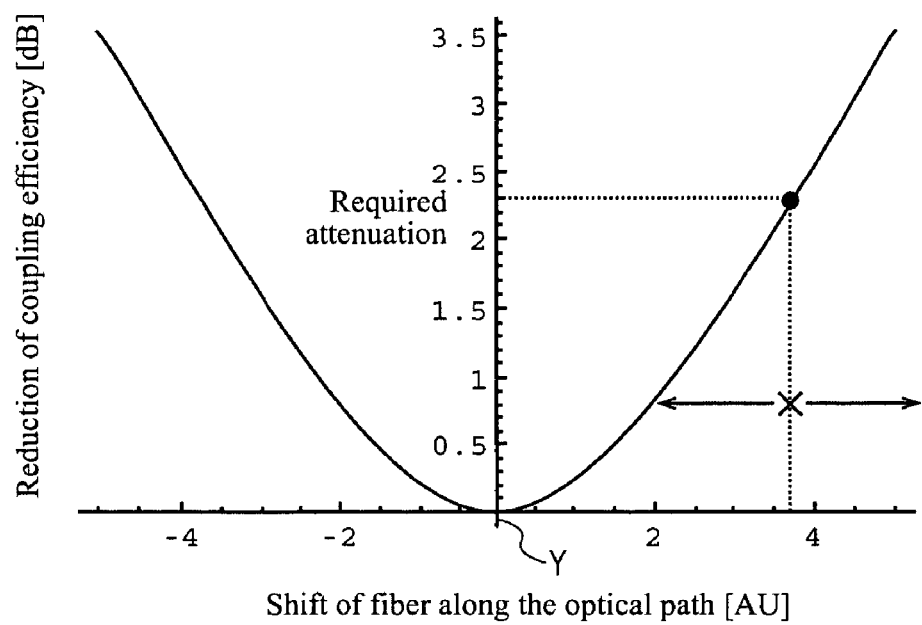
FIG. 2 is a graph showing coupling efficiency between a laser and an optical fiber against a shift of the laser relative to the optical fiber.
Figure 3:
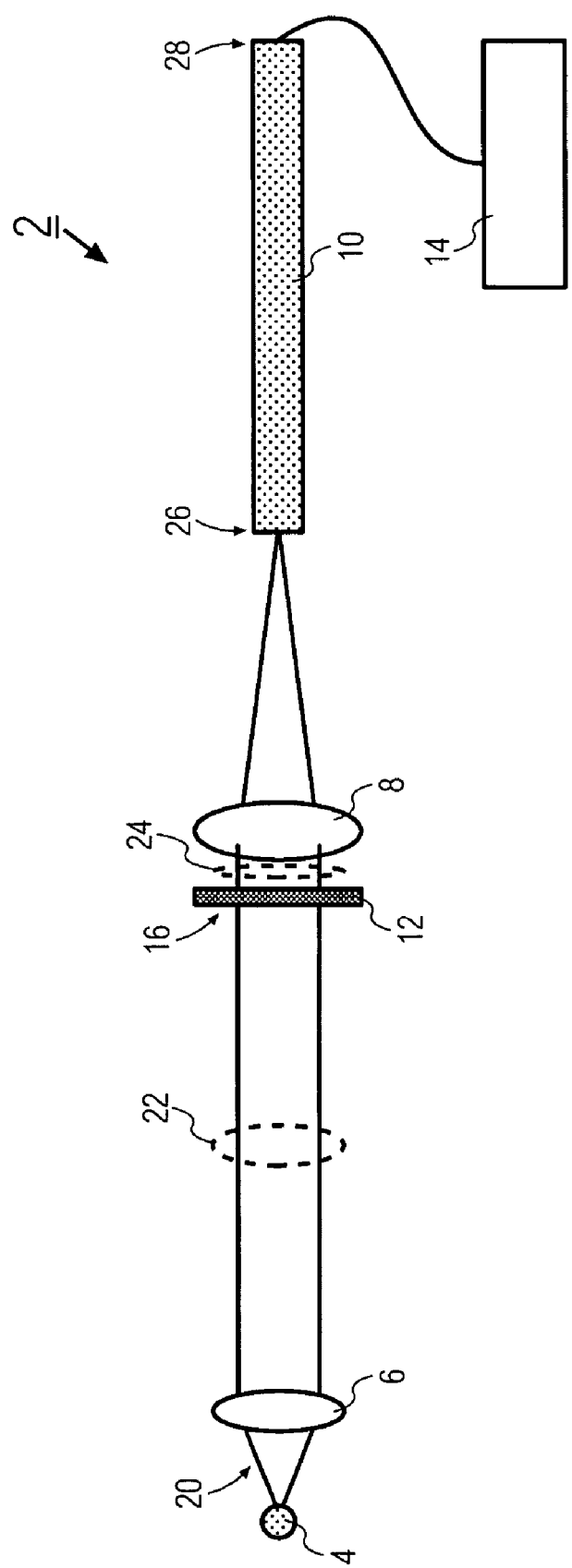
FIG. 3 is a schematic diagram of an experimental setup used for determining the level of attenuation of a light beam obtainable when allowed to propagate through a sample of a light transmissive material having a roughened surface.
Figure 4:
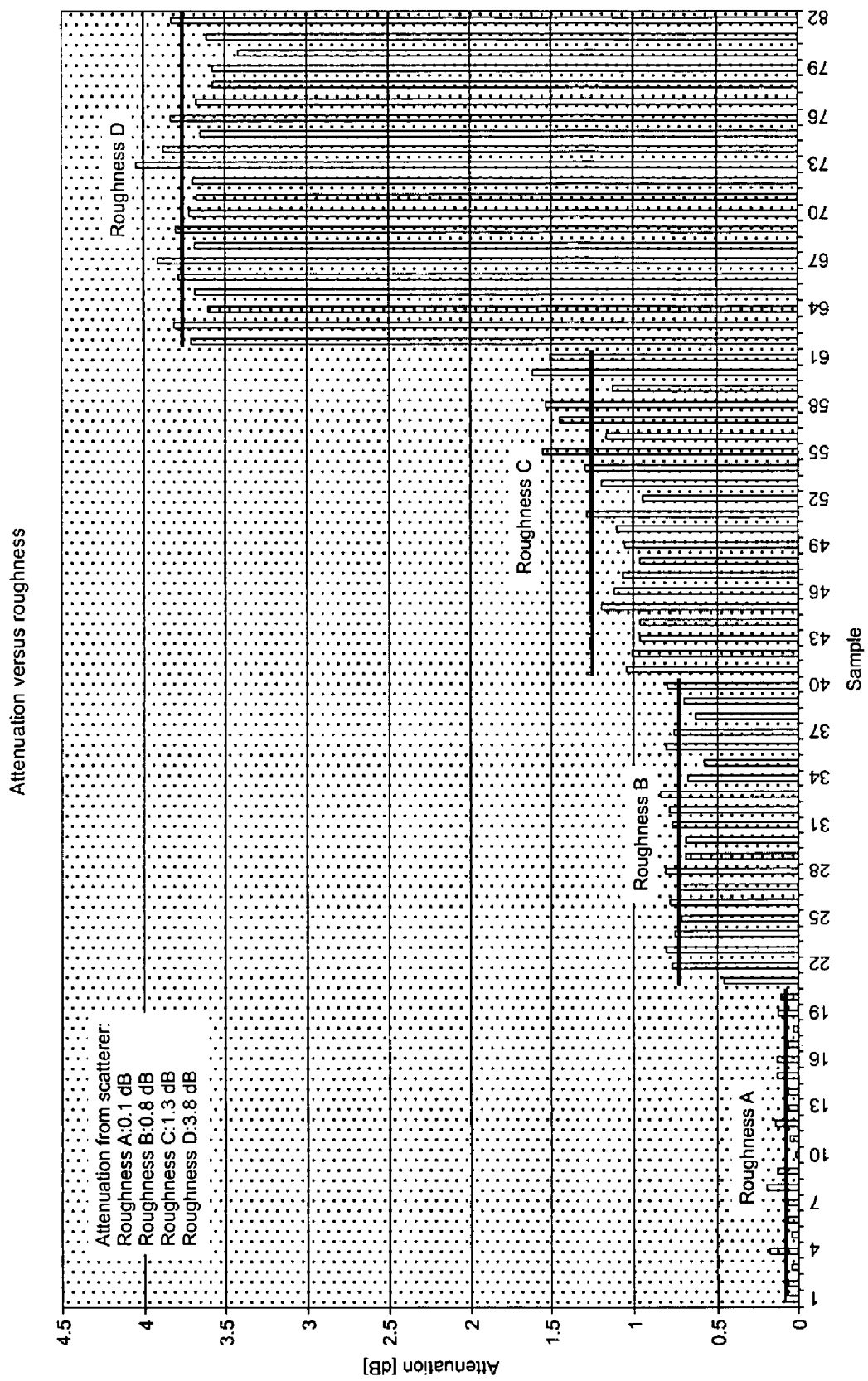
FIG. 4 is a graph showing attenuation levels obtained for multiple samples using the experimental setup in FIG. 3, the attenuation levels are shown grouped according to the degree of roughness of the samples.

The integrally formed light beam attenuator may include an integrally formed portion of an optical coupling module having a degree of roughness. This integrally formed portion attenuates a light beam by a level of attenuation corresponding to the degree of roughness. The required degree of roughness of the roughened portion or area may be determined empirically using an experimental setup 2 as shown in FIG. 3. The apparatus used in the experimental setup 2 include a light source 4, a 20× lens 6 having a numerical aperture (NA) of 0.4, a 10× lens 8 having an NA of 0.25, a 62.5 μm optical fiber 10 having an NA of 0.28, ninety samples 12 (one of which is shown in FIG. 3) of a material used for fabricating an optical coupling module and a light power meter 14. Surfaces of ten of the samples are formed to be smooth. The remaining eighty samples are divided into four groups of 20 samples each. A surface 16 of the four groups of samples 12 is formed to four different degrees of roughness, for example to degrees of roughness which are classified herein as roughness A, B, C and D in order of increasing roughness. Surface roughness is generally expressed in units of Root-mean-square (RMS) deviations about a mean line across a surface. Roughness A, B, C, D have roughness values between 0.025 micron RMS, which is perceived as corresponding to a 'smooth' surface, and 1.000 micron RMS, which is perceived as a 'rough' surface visible under light of between 400 to 700 nanometer wavelength.

With reference to FIG. 5, an optical coupling module 30, according to an embodiment of the invention for use in an optical coupling assembly 32 (FIG. 8) includes at least one internal portion or area 34 that scatters light propagating therethrough. This area 34 may be formed, for example by laser ablation, to be able to scatter a light beam to a degree corresponding to a desired level of attenuation of the light beam. The method for ablating such an internal area 34 using multiple lasers is known to those skilled in the art. During use, a light beam 36 is allowed to propagate through the module 30 to impinge on the light-scattering internal area 34. The light-scattering internal area 34 scatters the light beam 36 to consequently allow an attenuated light beam 36 therethrough to form the output light beam 38.

With reference to FIGS. 6A–6C, an optical coupling module 40, according to other embodiments of the invention includes at least one gap 42 defined therein. The gap 42 is flanked by a first surface 44 and a second surface 46, opposite the first surface 44, of the module 40. In other words, the first surface 44 and the second surface 46 define the gap 42 in the module 40. At least a portion of one or both of these two surfaces 44, 46 may be roughened to define at least one roughened surface portion of the module 40. A surface 44, 46 may be roughened using operations that include, but is not limited to, sand blasting, electro-discharge machining (EDM), turning, face-milling, ion or charged particle etching and surface grinding. Details of these operations can be found in "Manufacturing Technology Volumes 1 and 2", published by Addison Wesley Longman Limited, 1998. Other material-removing surface roughening operations may be used to roughen the surface 44, 46. It is not necessary to roughen the entire surface 44, 46, multiple portions of the surface 44, 46 may be roughened instead. These roughened surface portions may form a pattern on the surface 44, 46. The pattern may include, but not limited to, a hatching pattern, a spiral pattern and a radial pattern as shown in FIGS. 7A, 7B and 7C respectively. The roughened surface 44, 46 or surface portions function in a manner similar to the laser ablated internal area 34 in FIG. 5. The roughened surface 44, 46 or surface portions reflect, or more specifically scatter, a light beam impinging thereupon to thereby attenuate the light beam.

Alternatively, the optical coupling module 40 may be molded so that the surface 44, 46 has a degree of roughness. Accordingly, a mold (not shown) that is required for molding such an optical coupling module 40 has several walls that define a molding cavity. At least one of the walls has an inside surface that has a degree of roughness for molding the surface 44, 46 of the optical coupling module 40 to a corresponding degree of roughness. The molded surface 44, 46 has molded surface irregularities that partially scatter incident light away therefrom.

Both the first surface 44 and the second surface 46 may be perpendicular to a path of the light beam 36 to be parallel to each other as shown in FIG. 6A if the path of the light beam 36 does not need to be changed. However, if it is contemplated that the path of the light beam 36 may need to be offset or have its direction changed, one or both of the first surface 44 and the second surface 46 may be formed such that it is oblique to the path of the light beam 36 as shown in FIGS. 6B and 6C. When formed in this manner, the first surface 44 may be inclined at an angle with respect to the second surface 46 to result in a cross-section of the gap 42 that is shaped like a wedge. The surface or surfaces 44, 46 that is oblique to the light path may also be formed such that it splits the light beam 36 by partially internally reflecting the light beam 36 to form a partially reflected light beam 48 as shown in FIG. 6B. The partially reflected light beam 48 may be used as a feedback light beam for determining the intensity of the source light beam 36. The use of such a reflected light beam 48 will be described in more details shortly.

Figure 8:
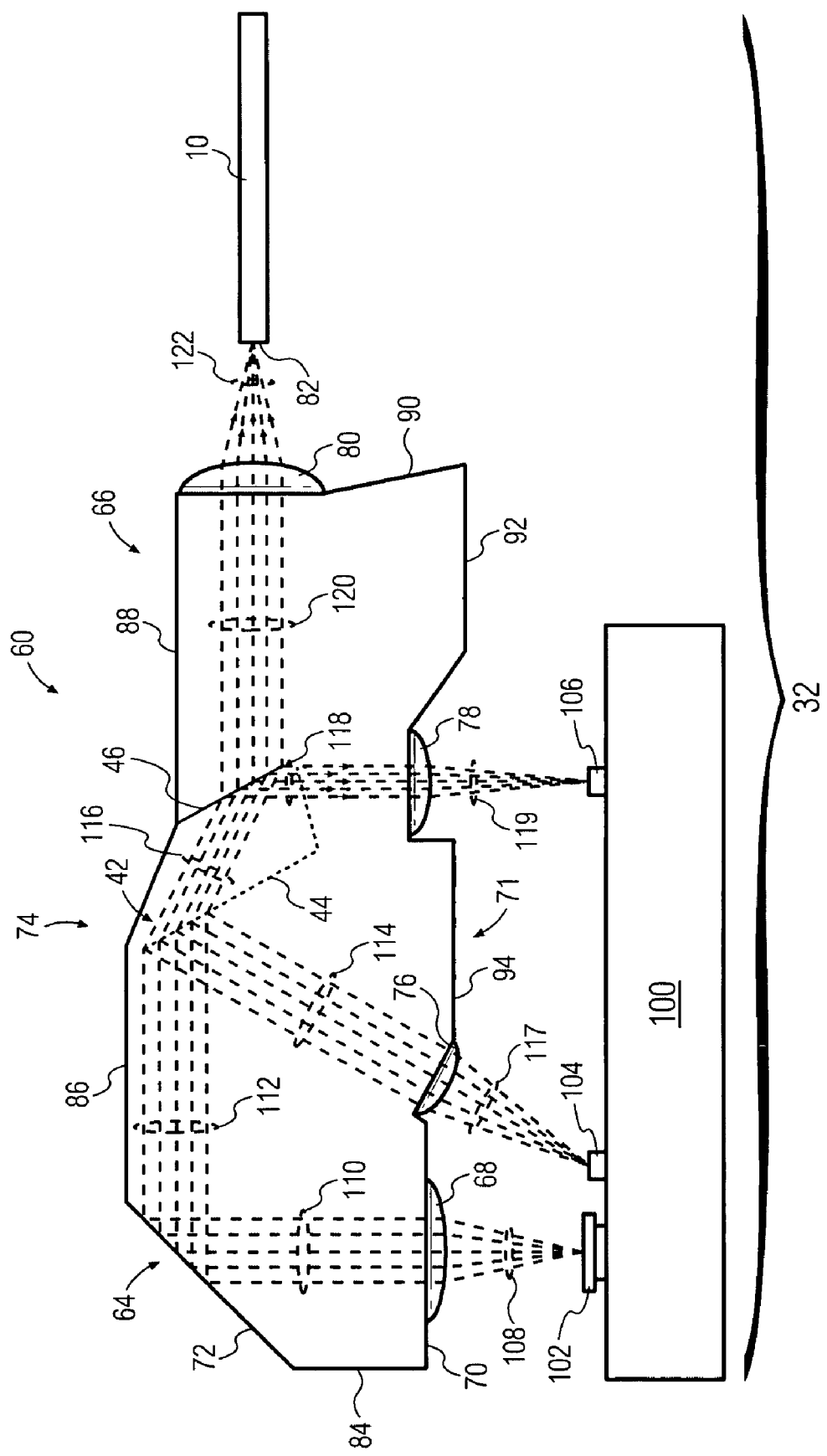
FIG. 8 is a side view of an optical coupling module according to yet another embodiment having other integrally formed optical elements in addition to the gap in FIGS. 6A, 6B and 6C.

With reference to FIG. 8, an optical coupling assembly including an optical coupling module 60 for coupling a light beam emitted from a light source, such as a VCSEL 102, into an optical fiber 10 is next described. This optical coupling module 60 includes a light beam input portion 64 and a light beam output portion 66. In this embodiment, the input portion 64 includes a collimating lens 68 on a surface 70 on a substrate-facing side 71 of the module 60 for transforming a diverging light beam, for example a laser output beam, to a collimated light beam. The input portion 64 further includes a total internal reflection optical turn surface or interface 72 capable of redirecting an incident light beam, for example through a 90-degree optical turn as shown in FIG. 8.

The module 60 includes an intermediate portion 74 interposed between the input portion 64 and the output portion 66. The intermediate portion 74 includes a gap 42 flanked by a first surface 44 and a second surface 46 of the module 60. The surfaces 44, 46 defining the gap 42 function as a beam splitter that is capable of splitting a light beam incident thereon into multiple light beams. One or both of the first and the second surfaces 44, 46 may be affirmatively roughened to a degree of roughness that allows the surface or surfaces 44, 46 to attenuate a light beam impinging thereupon by a level of attenuation corresponding to the degree of roughness. The intermediate portion 74 further includes a first focusing lens 76 and a second focusing lens 78 appropriately positioned on a respective surface on the substrate-facing side 71 of the module 60 for focusing light beams impinging thereon, for example onto respective optical detectors.

The output portion 66 includes an optical fiber facing lens 80 for focusing a light beam onto an end surface 82 of an optical fiber 10. All of the optical elements of this optical coupling module 60 are formed simultaneously and monolithically from the same material to result in a unitary design. Such a unitary design substantially reduces the cost and the complexity of fabrication of the optical coupling module 60. The unitary design also enhances the compactness, alignment precision and mechanical integrity of the optical alignment of the optical elements.

In addition to the optical elements described above, the optical coupling module 60 includes structural surfaces 84, 86, 88, 90, 92, 94 which provide mechanical integrity to the optical elements. During use, one or more of these surfaces 84, 86, 88, 90, 92, 94 serve as one or more alignment interfaces with other system components of the optical coupling assembly 32. These surfaces 84, 86, 88, 90, 92, 94 have opaque or diffused optical properties.

Also during use, the optical coupling module 60 is mounted with the substrate-facing side 71 opposite a substrate 100 and with the side surface 90 opposite an end surface 82 of the optical fiber 10. The substrate 100 has active optical components mounted thereon that include for example the vertical cavity surface emitting laser (VCSEL) 102, a first optical detector 104 and a second optical detector 106. When mounted, the collimating lens 68 and the second focusing lens 78 of the module 60 are aligned with the VCSEL 102 and the second optical detector 106 respectively.

Next, the propagation of a source light beam emitted from the VCSEL 102 through the optical coupling module 60 into the end surface 82 of the optical fiber 10 in the optical coupling assembly 32 is described. The module 60 receives a source input light beam 108 emitted from the VCSEL 102 at the collimating lens 68. The collimating lens 68 collimates the input light beam to form a collimated light beam 110. The collimated light beam 110 is reflected at the total internal reflection (TIR) interface 72 to be optically turned thereat by a predetermined optical turn angle to form a reflected light beam 112. The optical turn angle is shown in FIG. 8 to be 90 degrees but other turn angles are also possible.

The reflected light beam 112 is allowed to propagate through the module 60 to reach the first surface 44. The first surface 44 splits the reflected beam 112 by partially reflecting and partially refracting the reflected beam to form a first partially reflected light beam 114 and a first partially refracted light beam 116 respectively. The first partially reflected light beam 114 propagates through the module 60 to reach the first focusing lens 76. The first focusing lens 76 focuses the first partially reflected light beam 114 to form a first output light beam 117 that converges onto the first optical detector 104 to be captured thereby.

The first partially refracted beam 116 is allowed to propagate through an external medium in the gap 42 to reach the second surface 46. The second surface 46 further splits the first partially refracted light beam 116 by partially reflecting and partially refracting the first partially refracted light beam 116 to form a second partially reflected light beam 118 and a second partially refracted light beam 120 respectively. With the roughening of one or both of the first and second surfaces 44, 46 to a degree of roughness, the reflected beam 112 propagating therethrough is attenuated by a level corresponding to the degree of roughness to form the second partially refracted light beam 120 of reduced intensity. The second partially reflected light beam 118 propagates through the module 60 to the second focusing lens 78 to form a second output light beam 119 that converges onto the second optical detector 106 to be captured thereby.

The second partially refracted light beam 120 propagates to the output portion 66 to impinge on the fiber facing lens 80. The fiber facing lens 80 focuses the second partially refracted light beam 120 to form a third output light beam 122 that converges onto the end surface 82 of the optical fiber 10. The orientation of the first surface 44 and second surface 46 with respect to the total internal reflecting interface 72 is selected to determine the intensity and the direction of the first, second and third output light beams 117, 119, 122. The degree of roughness of the first surface 44, the second surface 46 or both the surfaces 44, 46 determines the intensity of the first, second and third output light beams 117, 119, 122.

The purposes of the optical detectors 104, 106 can include monitoring of the intensity of the source light beam 108 emitted by the VCSEL 102 and wavelength locking of the VCSEL 102. For wavelength locking, both optical detectors 104, 106 are utilized. The signals generated by the optical detectors 104, 106, corresponding to the first and second partially refracted light beams 114, 118 provide a measure of the wavelength of the VCSEL 102. This wavelength can then be adjusted to a desired wavelength by changing the operating conditions, such as drive current of the VCSEL 102 and/or by changing external environmental conditions, such as a temperature of the VCSEL 102.

It should be noted that the embodiment shown in FIG. 8 is for illustrative purposes only. It should therefore not be construed that all the optical elements shown therein are necessary to practice the invention. Accordingly, other embodiments having only some of the optical elements of the embodiment shown in FIG. 8 are possible. Some of these embodiments will be described below.

Figure 9:
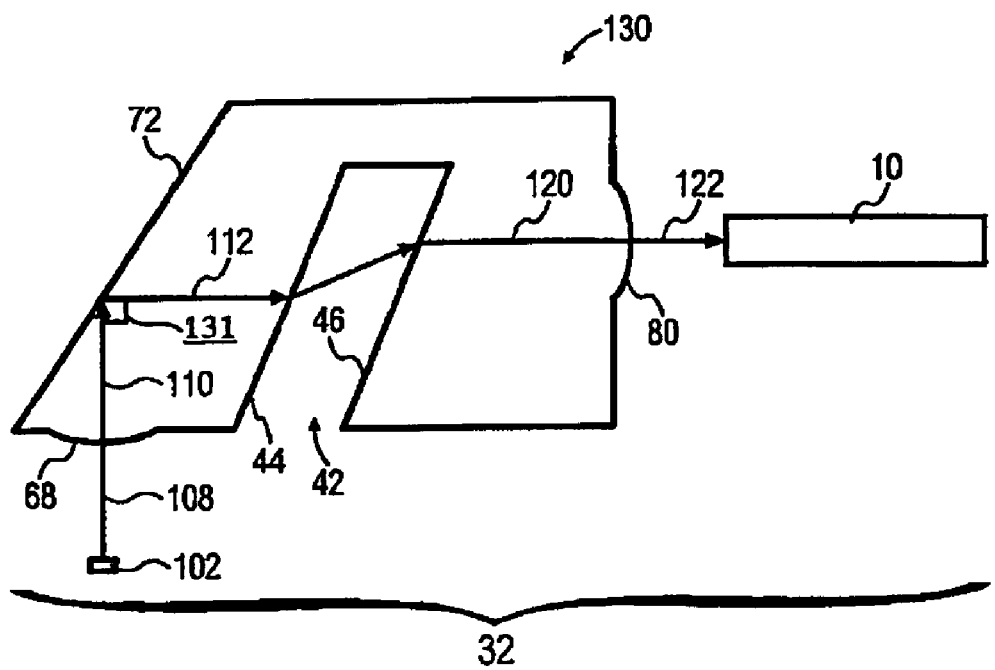
FIGS. 9 and 10 are side views of single beam optical coupling modules according to further embodiments of the invention.
Figure 10:
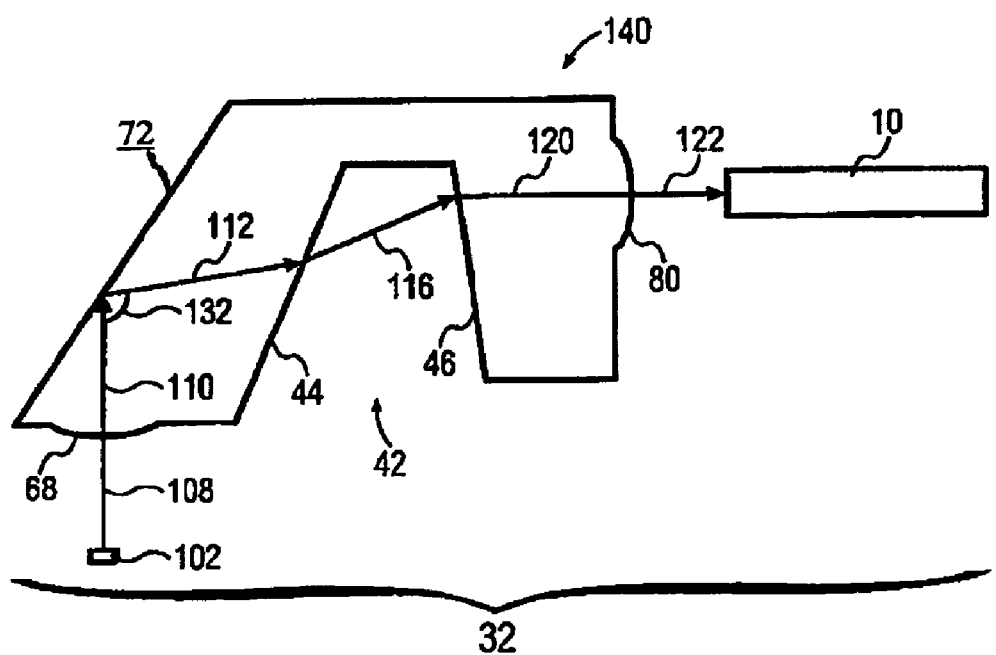

With reference to FIGS. 9 and 10, optical coupling modules 130, 140 according to alternative embodiments of the invention are described. Each of these embodiments includes optical elements, such as a collimating lens 68, a TIR interface 72, an air gap 42 and an optical fiber facing lens 80 for generating a single output light beam 122. In the module 130 depicted in FIG. 9, a VCSEL source 102 emits a diverging beam 108, which is collimated by collimating lens 68 integral to the module 130 to form a collimated light beam 110. The collimated light beam 110 in turn is reflected at a 90-degree angle 131 by total internal reflection at the interface 72, to form a horizontal total internally reflected light beam 112. This light beam 112 propagates through the gap 42 to be refracted by parallel surfaces 44, 46, one or both of which are roughened as described above, to form refracted and attenuated light beam 120 that is parallel to the horizontal light beam 112. The surfaces 44, 46 are oriented with respect to the reflective interface 72 to ensure that the refracted and attenuated light beam 120 is at an appropriate height to be focused accurately onto an optical fiber 10 by the integral fiber facing lens 80.

Similarly, the module 140 depicted in FIG. 10, a VCSEL 102 emits a diverging beam 108, which is collimated by a collimating lens 68 integral to the module 140 to form a collimated beam 110. This beam 110 in turn is reflected at a non-90 degree angle 132 by total internal reflection at the interface 72, to form a diagonal total internally reflected beam 112. This light beam 112 propagates through the gap 42 defined by non-parallel first and second surfaces 44, 46, (one or both of which are roughened as described above) to be refracted upward at first surface 44 to form a first refracted beam 116. This beam 116 is refracted again at the second surface 46 to form a refracted and attenuated light beam 120 which is aligned and parallel to an axis of an optical fiber 10. The integral fiber-facing lens 80 focuses the attenuated light beam 120 onto the optical fiber 10. The module 140 is manufactured such that the optical elements are oriented such that the light beam 120 is accurately focused onto the optical fiber.

Figure 11:
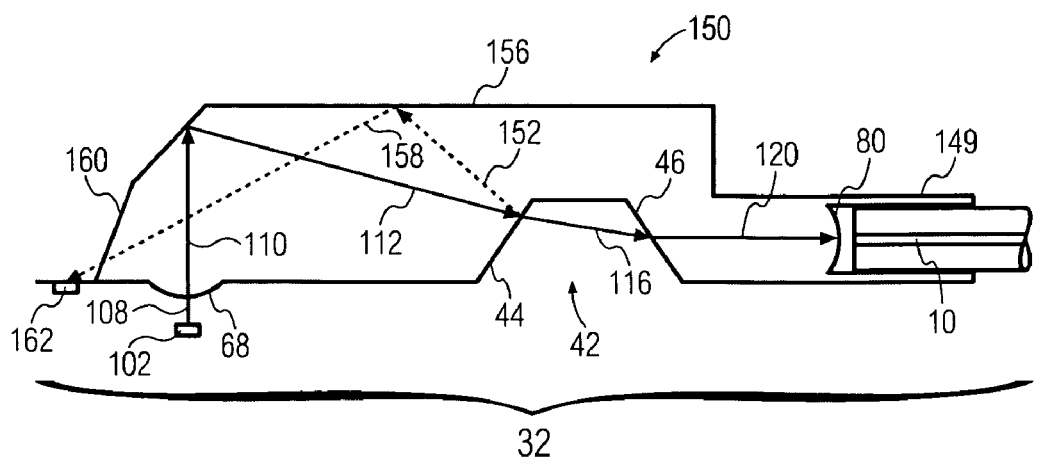
FIG. 11 is a side view of a multiple beam optical coupling module according to yet another embodiment of the invention.

FIG. 11 depicts a multi-beam optical coupling module 150 that is configured to include a reflected light beam that is used for monitoring the intensity of a source light beam emitted by a VCSEL 102. The VCSEL 102 emits a diverging beam 108, which is collimated by an integral collimating lens 68 to form a collimated light beam 110. The light beam 110 is reflected at a non-90 degree angle by total internal reflection at an interface 72 to form a downward slanted light beam 112. At a first surface 44 defining an air gap 42 that functions as a beam splitter, the light beam 112 is partially reflected to form a first reflected beam 152 and partially refracted to form a refracted beam 116, which propagates through an second surface 46 to form an output beam 120. This output light beam 120 is focused by a fiber facing lens 80 onto an optical fiber 10 that is coupled or connected to an outlet or port connector 149 integral with the module 150. The partially reflected beam 152 is reflected at a total internal reflection interface 156 to form a monitor light beam 158, which propagates through an interface 160 onto a monitor optical detector 162. As in the earlier described embodiments, one or both of the first and the second surfaces 44, 46 may be roughened for attenuating the source light beam 108.

It is also possible for this module 150 to be used for coupling a light beam that is received from the optical fiber 10. The integral fiber-facing lens 80 collimates a received light beam from the optical fiber. This received light beam retraces the paths of the light beams 120, 116. The received light beam is also partially refracted at the second surface 46 to retrace the paths of the light beams 116 and 112 through a total internal reflection turn at the interface 72 and then through the collimating lens 68 onto a monitor diode (not shown) located behind the VCSEL 102. When used in this manner, the port connector 149 is considered as an inlet adapted to couple to the optical fiber 10.

Figure 12:
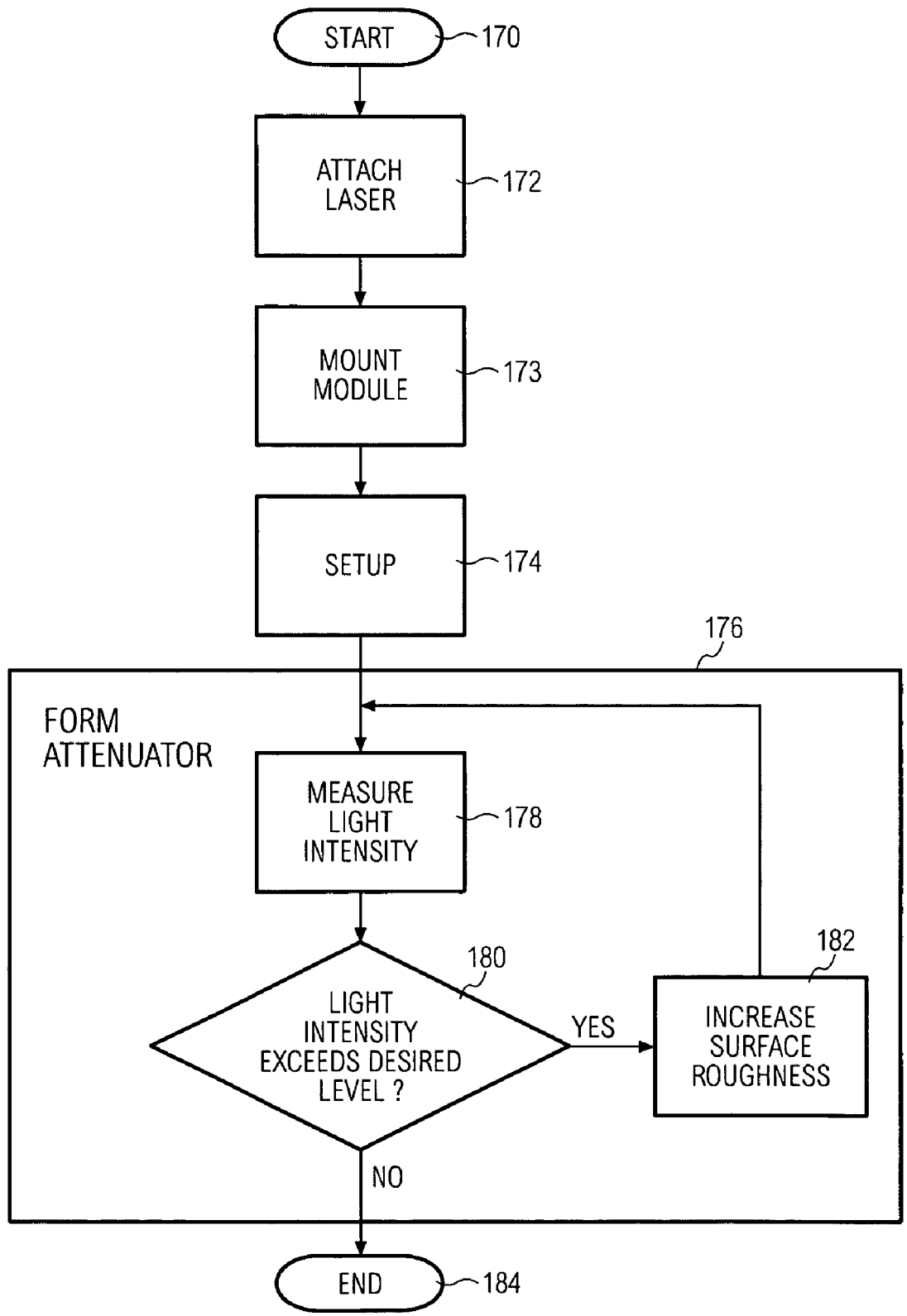
FIG. 12 is a flowchart showing a sequence of steps for integrally forming an attenuator in an optical coupling module.

A method for forming an optical coupling module, such as module 150 shown in FIG. 11, is next described with the aid of FIG. 12. The method starts in a START step 170 and proceeds to an ATTACH LASER step 172, wherein a laser, such as a VCSEL 102, is attached to a substrate 100 of an optical coupling assembly. The method next proceeds to a MOUNT MODULE step 173, wherein a monolithic optical coupling module 150 having a light beam input portion and a light beam output portion is positioned over the VCSEL 102 on the substrate 100, aligned with the VCSEL 102 and fixedly attached to the substrate 100. The method next proceeds to a SETUP step 174, wherein an optical fiber 10 is connected at one end to a port connector 149 of the optical coupling module 150 and connected at the second end to a light power meter (not shown). The VCSEL 102 is activated to emit an input light beam 108 of a known intensity that is directed at the light beam input portion of the module 150. The input light beam propagates through the optical coupling module 150 along a light beam path between the light beam input portion and the light beam output portion. This input light beam exits the module 150 via the light beam output portion as an output light beam. The method next proceeds to a FORM ATTENUATOR step 176, wherein any of the above-described operations may be used to integrally form an attenuator in the light beam path of the optical coupling module 150. The attenuator may for example be a roughened surface 46 as previously described.

The roughened surface 46 in the FORM ATTENUATOR step 176 may be obtained using a process that will be described next. In a MEASURE LIGHT INTENSITY step 178, the intensity of the output light beam is measured using the power meter to determine an attenuation of the input light beam. The method then proceeds to a LIGHT INTENSITY AT DESIRED LEVEL? decision step 180, wherein the measured light intensity is compared with a desired intensity level to determine if it exceeds the desired intensity level. If it is determined in this step 180 that the measured light intensity exceeds the desired intensity level, the method proceeds to an INCREASE SURFACE ROUGHNESS step 182, wherein the surface 46 is roughened by an incremental degree of roughness to further attenuate the light beam. The method loops around the MEASURE LIGHT INTENSITY step 178, the LIGHT INTENSITY AT DESIRED LEVEL? decision step 180 and the INCREASE SURFACE ROUGHNESS step 182 until it is determined in the INTENSITY AT DESIRED LEVEL? decision step 180 that the measured light intensity is the same or lower than the desired intensity level. In such a case, the incremental forming of the attenuator is completed and the method proceeds to an END step 184. Accordingly, the surface 46 is roughened to attenuate the input light beam to have the measured intensity of the output light beam at a predetermined level.

Alternatively, a predetermined attenuator may be integrally formed, not incrementally as described above but in a single operation, based on the measured intensity of the output light beam. The predetermined attenuator may be a surface of a predetermined degree of roughness.

The method described above may be automated. Variations of the method are also possible. For example, instead of mounting the optical coupling module 150 on a substrate 100 having a VCSEL 102 thereon and activating the VCSEL 102 to produce a light beam that propagates through the module 150, the module 150 may be mounted on a production fixture instead. An external light beam may then be directed at the input portion of the module to allow the light beam to propagate through the module so that an attenuator may be formed using the above-mentioned FORM ATTENUATOR step 176 to thereby attain a predetermined attenuation relative to the intensity of the light beam.

An advantage of the optical coupling module according to the invention is that the optical port and the optical elements of the optical coupling module may be integrally molded in a single molding operation to be of a unitary design. The shape and the relative dimensions of the optical port and the optical elements may thus be precisely controlled during the molding operation so as to minimize the occurrence of tolerance build-up. Accordingly, the use of such a single molding operation to produce the optical coupling module substantially reduces the uncertainty and variability of the tolerance buildup associated with prior art devices. The unitary design also allows easier assembly of the optical coupling module as compared to prior art devices. Another advantage of the optical coupling module according to the invention is that attenuation of a light beam is achieved by provision of a roughened area. This roughened area is easier to produce, especially on a molded optical coupling module, as compared to misalignment of optical elements or deposition of a reflective coating on surfaces of an optical coupling module.

Although the invention is described as implemented in the above-described embodiments wherein one or both surfaces defining a gap in the optical coupling module are roughened to a degree of roughness to function as an attenuator, it is not to be construed to be limited as such. For example, the TIR surface for optically turning a light beam, a surface of the optical fiber facing lens through which an output light beam exits the module, a surface of the laser facing lens through which an input light beam enters the module and at least one internal area of the module may also be roughened, on their own or in combination with one or both of the first and second surfaces defining the gap to attenuate a light beam. The surface of the optical fiber facing lens and the surface of the laser facing lens therefore define a third and fourth surfaces respectively of the module that may be roughened.

As another example, the attenuator may also include at least one portion of an optical coupling module that is integrally formed to have a partial beam blocking, a partial beam reflecting or a wavefront shape changing property.

Figure 13:
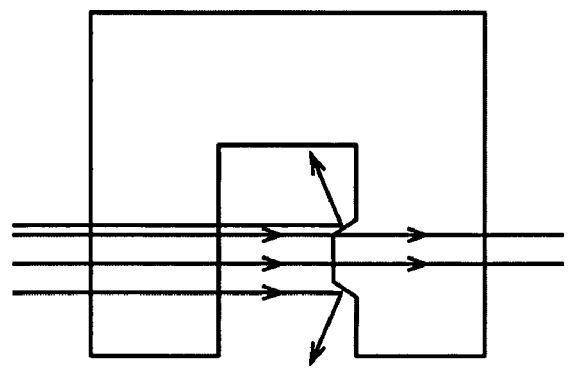
FIG. 13 is a side view of an optical coupling module having an integrally formed beam reflector that functions as an attenuator.

FIG. 13 shows an optical coupling module having a surface that is formed to include a frustum that functions as a partial beam reflector. The frustum is located in a path of a light beam. When a light beam impinges on this frustum, a portion of the light beam falling on a surface of the frustum substantially perpendicular to the beam path is allowed to propagate therethrough. However, portions of the light beam falling on the slanted surface or reflective portion, oblique to the beam path, will be reflected away therefrom and not be allowed to propagate therethrough. In this manner, the light beam is attenuated.

Figure 14:
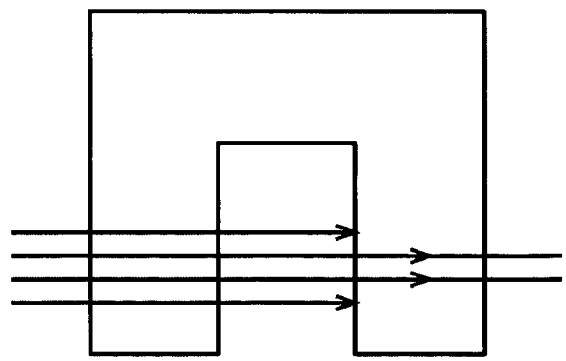
FIG. 14 is a side view of an optical coupling module having an integrally formed beam blocker which functions as an attenuator.

FIG. 14 shows an optical coupling module having a surface that is formed to function as a partial beam blocker. It is advantageous for a partial beam blocking type of attenuator to have a light blocking pattern, such as a radial pattern shown in FIG. 7C, that is rotationally symmetrical. Such a blocking pattern provides an attenuation level that is independent of the laser mode profile, which is typically rotationally or mirror symmetric.

Beam reflecting, blocking and scattering type of attenuators are suitable for use with multimode lasers like VCSELs. In applications involving single mode lasers wavefront shape changing type of attenuators are more suitable.

We claim:
1. A monolithic optical coupling module comprising:
   a light input portion;
   a light output portion; and
   further comprising;
   a first surface portion and a second surface portion opposite the first surface portion, wherein the first surface portion and the second surface portion define a gap in the monolithic optical coupling module;
   a total internal reflection optical turn interface portion that turns a light beam incident on the optical turn interface portion towards the gap,
   a third surface portion through which the light beam exits the monolithic optical coupling module; and
   a fourth surface portion through which the light beam enters the monolithic optical coupling module,
   wherein at least one of the first surface portion, the second surface portion, the optical turn interface portion, the third surface portion and the fourth surface portion comprises an integrally-formed light beam attenuator that attenuates a light beam propagating therethrough to provide an attenuated light beam.

2. A monolithic optical coupling module according to claim 1, wherein the light beam output portion comprises an outlet adapted to couple to at least one optical fiber.

3. A monolithic optical coupling module according to claim 1, wherein the light beam input portion comprises an inlet adapted to couple to at least one optical fiber.

4. A monolithic optical coupling module according to claim 1, wherein the at least one integrally formed light beam attenuator comprises at least one light reflective portion that is disposed in the optical path to reflect at least some incident light away therefrom.

5. A monolithic optical coupling module according to claim 1, wherein the at least one integrally formed light beam attenuator comprises a laser ablated portion.

6. A monolithic optical coupling module according to claim 1, wherein the at least one integrally formed light beam attenuator comprises a roughened surface portion that has a predetermined degree of roughness;
   wherein during use, the roughened surface portion partially scatters incident light away therefrom to attenuate the incident light by a degree of attenuation corresponding to the predetermined degree of roughness.

7. A monolithic optical coupling module according to claim 6, wherein the roughened surface portion comprises a surface having molded surface irregularities;
wherein during use, the molded surface irregularities partially scatter incident light away therefrom.

8. A monolithic optical coupling module according to claim 6, wherein the roughened surface portion comprises one of a sand-blasted, an electro-discharge machined, a turned, a face-milled, a charged particle-etched and a ground surface portion.

9. A monolithic optical coupling module according to claim 6, wherein the roughened surface portion comprises a plurality of light reflective portions.

10. A monolithic optical coupling module according to claim 9, wherein the plurality of light reflective portions are disposed to form a pattern.

11. A monolithic optical coupling module comprising:
a first surface portion and a second surface portion opposite the first surface portion, wherein the first surface portion and the second surface portion define a gap in the monolithic optical coupling module
a total internal reflection optical turn interface portion that turns a light beam incident on the optical turn interface portion towards the gap,
a third surface portion through which the light beam exits the monolithic optical coupling module; and
a fourth surface portion through which the light beam enters the monolithic optical coupling module,
wherein at least one of the first surface portion, the second surface portion the optical turn interface portion, the third surface portion and the fourth surface portion comprises an integrally-formed light beam attenuator that attenuates a light beam propagating therethrough to provide an attenuated light beam.

12. A monolithic optical coupling module according to claim 11, wherein the at least one of the first surface portion and the second surface portion is roughened to a degree of roughness to define the integrally-formed light beam attenuator, the light beam attenuator being able to attenuate the light beam by a level of attenuation corresponding to the degree of roughness.

13. A monolithic optical coupling module according to claim 11 wherein at least one of the optical turn interface portion, the third surface portion and the fourth surface portion comprises a second integrally-formed light beam attenuator that attenuates a light beam propagating therethrough to provide an attenuated light beam.

14. A monolithic optical coupling module according to claim 11 wherein at least one of the optical turn interface portion, the third surface portion and the fourth surface portion is roughened to a degree of roughness to define the integrally-formed light beam attenuator, the light beam attenuator being able to attenuate the light beam by a level of attenuation corresponding to the degree of roughness.

15. A method for forming a monolithic optical coupling module, wherein the monolithic optical coupling module has
a light beam input portion and a light beam output portion,
a first surface portion and a second surface portion opposite the first surface portion, wherein the first surface portion and the second surface portion define a gap in the monolithic optical coupling module,
a total internal reflection optical turn interface portion that turns a light beam incident on the optical turn interface portion towards the gap,
a third surface portion through which the light beam exits the monolithic optical coupling module; and
a fourth surface portion through which the light beam enters the monolithic optical coupling module
wherein at least one of the first surface portion, the second surface portion, the optical turn interface portion, the third surface portion and the fourth surface portion comprises an integrally-formed light beam attenuator that attenuates a light beam propagating therethrough to provide an attenuated light beam,
the method further comprising:
integrally forming a light beam attenuator in a light path between the light beam input portion and the light beam output portion.

16. A method according to claim 15, wherein integrally forming the light beam attenuator comprises:
providing an input light beam of known intensity to the light beam input portion, the input light beam propagating through the monolithic optical coupling module to exit the module via the light beam output portion as an output light beam;
measuring the intensity of the output light beam to determine an attenuation of the input light beam; and
integrally forming at least one light reflective portion to further attenuate the input light beam to thereby attain a predetermined attenuation relative to the intensity of the input light beam.

17. A method according to claim 15, wherein the monolithic optical coupling module is mounted adjacent a light source of an optical coupling assembly, and wherein integrally forming the light beam attenuator comprises:
providing an input light beam from the light source to the light beam input portion, the input light beam propagating through the monolithic optical coupling module to exit the module via the light beam output portion as an output light beam;
measuring the intensity of the output light beam; and
integrally forming at least one light reflective portion to attenuate the input light beam to have the measured intensity of the output light beam at a predetermined level.

18. A method according to claim 15, wherein integrally forming the light beam attenuator comprises laser ablating an internal portion of the monolithic optical coupling module.

19. A method according to claim 15, wherein integrally forming the light beam attenuator comprises roughening a surface of the monolithic optical coupling module.

20. A method according to claim 19, wherein roughening a surface comprises one of sand-blasting, electro-discharge machining, turning, face-milling, charged particle etching and grinding the surface.

* * * * *